United States Patent [19]

Yachida

[11] Patent Number: 5,802,591
[45] Date of Patent: Sep. 1, 1998

[54] METHOD AND SYSTEM FOR PREVENTING UNAUTHORIZED ACCESS TO INFORMATION STORED IN A COMPUTER

[75] Inventor: Masuyoshi Yachida, Yokohama, Japan

[73] Assignee: Ricoh Company, Ltd., Tokyo, Japan

[21] Appl. No.: 550,807

[22] Filed: Oct. 31, 1995

[30] Foreign Application Priority Data

Oct. 31, 1994 [JP] Japan .................. 6-267030

[51] Int. Cl.$^6$ .................................. G06F 9/45
[52] U.S. Cl. .................. 711/164; 711/163; 711/158; 711/161; 711/151
[58] Field of Search .................. 380/4, 25, 23; 395/491, 186, 600

[56] References Cited

U.S. PATENT DOCUMENTS

| | | | |
|---|---|---|---|
| 3,328,765 | 6/1967 | Amdahl et al. | 340/172.5 |
| 4,713,753 | 12/1987 | Boebert et al. | 364/200 |
| 5,065,429 | 11/1991 | Lang | 380/25 |
| 5,163,147 | 11/1992 | Orita | 395/600 |
| 5,313,637 | 5/1994 | Rose | 395/725 |

Primary Examiner—Tod R. Swann
Assistant Examiner—Fred Fei Tzeng
Attorney, Agent, or Firm—Oblon, Spivak, McClelland, Maier & Neustadt, P.C.

[57] ABSTRACT

A computer system which prevents unauthorized access to files within a memory such as a disk. A first software program within the computer attempting to access the files is authorized to access the files whereas another software program within the computer is not authorized to access the files. When the first software program desires to access the files and uses the appropriate password or key-code, the first software program is allowed access to the information whereas the second software program within the same computer is not allowed access to the information within the files. The files may be stored in a file server which is networked to a client computer containing the software programs. Alternatively, the files may be stored in an intelligent peripheral device which is not located within a conventional file server and the computer connected to the peripheral device includes the software programs which attempt to access the files within the peripheral device.

18 Claims, 3 Drawing Sheets

METHOD AND SYSTEM FOR PREVENTING UNAUTHORIZED ACCESS TO INFORMATION STORED IN A COMPUTER

BACKGROUND OF THE INVENTION

1. Field of the Invention

This invention generally relates to a method and system for keeping secure from unauthorized access, information stored in a computer memory such as a disk of a network file server.

2. Discussion of the Background

Information used by a computer may be stored in an optical disk, hard disk, floppy disk or other storage device and security of this information is a serious concern. A data filing system may include a host computer such as a networked file server having a security function and a memory such as a disk which is accessed by an accessing computer, referred to as a client or workstation, which is operated by a user. After establishing communication between the host computer which has the stored information and the client such as by entering a password at the client, the client computer can access the information in the memory in the host computer.

Generally, a computer can operate different programs in parallel so the client computer can operate two kinds of programs; one (program "A") has an access privilege to the memory, and the other (program "B") does not have an access privilege. However, in such a system, the client computer can access the data in the memory using the software "B" because of the general access granted by the host. This may allow unauthorized access to the information on the file server. Further, if the client computer accesses the data in the memory using the software "B", the data may become corrupted because the software may not have compatibility with the file format of the data.

SUMMARY OF THE INVENTION

It is therefore an object of the present invention to provide a computer system in which the above-mentioned disadvantages are eliminated.

It is another object of the invention to provide a method and computer system for preventing unauthorized access to information stored in the memory of a computer such as a networked file server.

These and other objects are accomplished by a computer system including a client computer connected to a file server via a communication line. The file server contains files or data which should be accessible to a first software program running on the client computer but not accessible to a second software program running on the client computer. When the second software of the client computer attempts to access the files in the file server, the access is rejected as this second software program is not authorized to access the files. However, when the first software within the client computer attempts to access the file server using the appropriate password or predetermined key-code, the file server allows access to the files therein by the first software within the client computer as this software has the appropriate access privilege. When the first software program is done accessing the files within the file server, the first computer sends an end of access signal to the file server, and the first and second software programs can no longer access the files within the file server.

According to a second aspect of the invention, when the client computer is finished accessing the files within the file server, the client computer sends a reset signal to the file server to reset the file server to a state in which the files within the file server cannot be accessed.

According to a third aspect of the invention, the reset signal of the second embodiment resets only access to one of a plurality of memory devices and the other memory devices such as different disks are not affected.

According to a fourth aspect of the invention, when the client computer is finished accessing the information on the file server, the client computer sends a command which initializes only the access procedure within the file server. The other aspects and functions performed by the file server are not initialized.

According to a fifth aspect of the invention which is based on the first embodiment, once communication is established between the first software program of the client computer and the file server, the file server changes the access procedure therein so that the client computer can access the files within the file server whenever desired. During this time, the second software program cannot access the information within the file server. When the first software program is finished accessing the files within the file server, the communication procedure within the file server is changed so that the first software program can no longer access the files within the file server.

BRIEF DESCRIPTION OF THE DRAWINGS

A more complete application the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
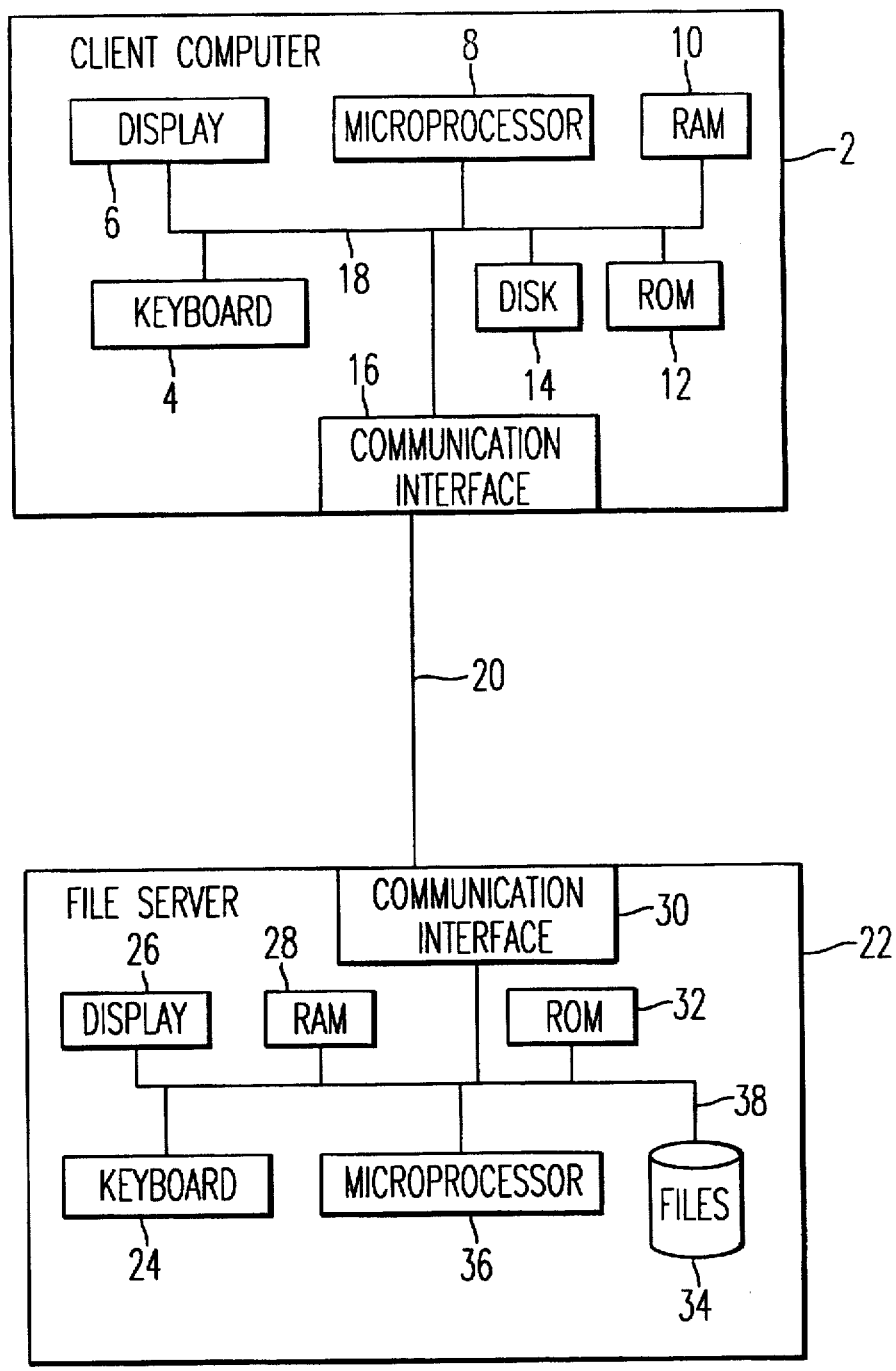
FIG. 1 is a block diagram showing the information security system according to the present invention.

Referring now to the drawings wherein like reference numerals designate identical or corresponding parts throughout the several views and more particularly to FIG. 1 thereof, there is illustrated a block diagram of an information storage system incorporating a security function according to the present invention. The computer system includes a client computer 2 having a keyboard 4, display 6, microprocessor 8, RAM 10, ROM 12, a disk such as a hard disk 14, and a communication interface 16, each connected to an internal bus 18. There is also a file server 22 including a keyboard 24, display 26, RAM 28, communication interface 30, ROM 32, a disk 34 containing files, a microprocessor 36, each connected to an internal bus 38. The communication interfaces of the client computer 2 and the file server 22 are connected via a communication line 20.

The disk 34 stores and manages information such as medical information. This disk may be implemented as a hard disk, an optical disc, an optical-magnetic disk, a floppy disk, a compact disk, or other suitable storage medium.

The client computer 2 and file server 22 may be connected via a conventional computer network line such as an Ethernet or other network connection. Alternatively, the communication line 20 may be implemented using an IDE interface, a SASI (Shugart Associates Systems Interface), or a SCSI (Small Computer System Interface). If the connection 20 is implemented as a connection typically used to connect peripherals such as disks to an interface card within a computer, then the file server 22 does not have to be a conventional file server computer but may be implemented as simply a memory device such as an intelligent disk drive having the capabilities to selectively permit and deny access thereto, as desired, in accordance with the teachings of the invention.

Within the client computer 2 are installed two kinds of software; one is a software "A" which is programmed to have an access privilege to the files 34 in the file server 22, and the other software "B" in the client computer 2 is not programmed to have an access privilege to the files 34. The software "B" is, for example, a program such as a word processing program for accessing information which is in the client computer 2 and does not need nor have the ability to access the information in the file server 22. The client computer 2 performs tasks and accesses the desired information by the software "A" and "B."

Figure 2:
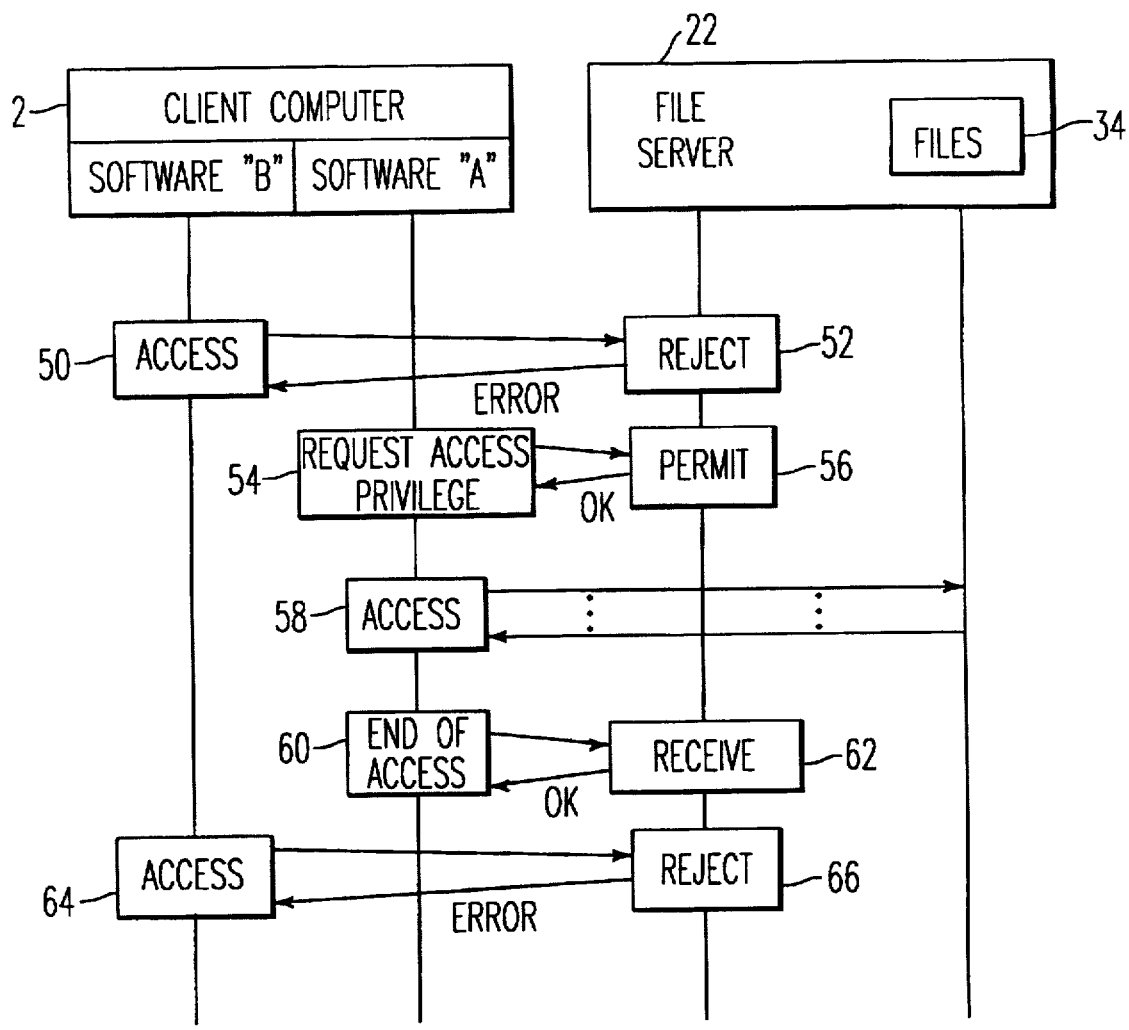
FIG. 2 is a data flow diagram showing an aspect of the operation of the invention.

FIG. 2 is a data flow diagram showing a process of accessing data or files within the file server 22 according to the first embodiment. In FIG. 2, initially it is impossible for the client computer 2 to read/write data stored in the files using either the software "A" or "B."

In FIG. 2, software "B" first attempts to access the file server 22 using software "B" in step 50. The file server 22 recognizes that access from the client computer 2 is only permissible when the client computer is authorized. As software "B" does not have an access privilege, the file server 22 rejects the access attempt in step 52 and sends an error message to the client computer 2.

Next, the client computer 2 attempts to access the file server 22 using the software "A" in step 54. The file server 22 then determines whether or not the software "A" is authorized to access the files 34. For example, the client computer 2 sends a pre-decided key-code or password to the file server 22 and file server 22 recognizes whether or not the key-code or password is correct in step 56. Recognizing that access by the software "A" is permissible, the file server 22 permits access in step 56.

After receiving permission from the file server 22, the client computer 2, using the software program "A," sends a read or write command for reading or writing the information in the files 34 in step 58 and the file server 22 permits the reading and writing of the files 34.

When the access to the files 34 is complete or no longer desired, the client computer 2, using the software "A," sends a signal or command indicating the end of "end of access" to the file server 22 in step 60. The file server 22 receives the signal or command and denies future access by software "A" to the files 34 in step 62.

After receiving the "end of access" signal or commands from step 62, the client computer 2 again needs to establish access to the file server 22 by the predetermined procedures before access will be permitted, even when using the software program "A". Accordingly, file server 22 rejects in step 66 access attempts in step 64 from the client computer 2 using software "B," and returns an error message to the accessing apparatus 1. This denial of unauthorized access is a reliable and effective security measure to prevent unauthorized access to the secured information.

In the second embodiment, the client computer 2 and file server 22 have the same basic structure as the system illustrated in FIG. 1. However, the communication line 20 between the client computer 2 and the file server 22 has a reset line for resetting the file server 22. Using this reset line, the client computer 2 can initialize the file server 22.

The client computer 2 includes a function, implemented in the software "A," which sends a reset signal to the file server 22 over the reset line when finishing access using software "A". If this reset signal is in the form of a software command transmitted over the communication line 20, there is no need to have a dedicated line within line 20 to transmit the rest signal or command. Upon receiving the reset signal, the file server initializes a program used to gain access to the files 34 to an initial state in which access to the files 34 is not permitted. The software "B" is not permitted to access the file server 22.

Generally, the communication line 20 may be connected to a plurality of client computers 2 or file servers 22, and the files 34 may be stored in a plurality of memory devices. The SCSI, for example, connects a plurality of hard disk apparatuses, disk cartridge apparatuses, and/or optical-magnetic disk apparatuses. However, a reset command from one of the client computers 2 may have a bad effect on the other computers or peripherals in the system. For example, a reset from one of the client computers 2 might reset access of the other client computers to the desired information.

The third embodiment of the invention is based on the second embodiment of the invention and solves the above-mentioned problems so that when the reset signal is sent, the reset signal resets only access to one of the memories such as one hard disk by performing the appropriate initialization process, for example. Any other memory device within the file server 22 is not affected by the reset signal in this embodiment.

In the fourth embodiment of the invention which is based on the other embodiments, the client computer 2 sends a command such as a reset command which initializes only the access procedure within the file server 22, and does not initialize other aspects of the file server 22. In the fourth embodiment, after finishing accessing of the files 34 in the file server 22, the client computer 2, using the software "A," sends a command which initializes only the access program of the file server 22.

After finishing access by the software "A" a reset signal is sent to the appointed file server 22. When the file server 22 receives the reset signal, the appointed file server 22 initializes only the access program therein and rejects subsequent access. However, the other programs of the file server 22 are not initialized. Thus, it is possible to keep other jobs operating after finishing accessing.

Figure 3:
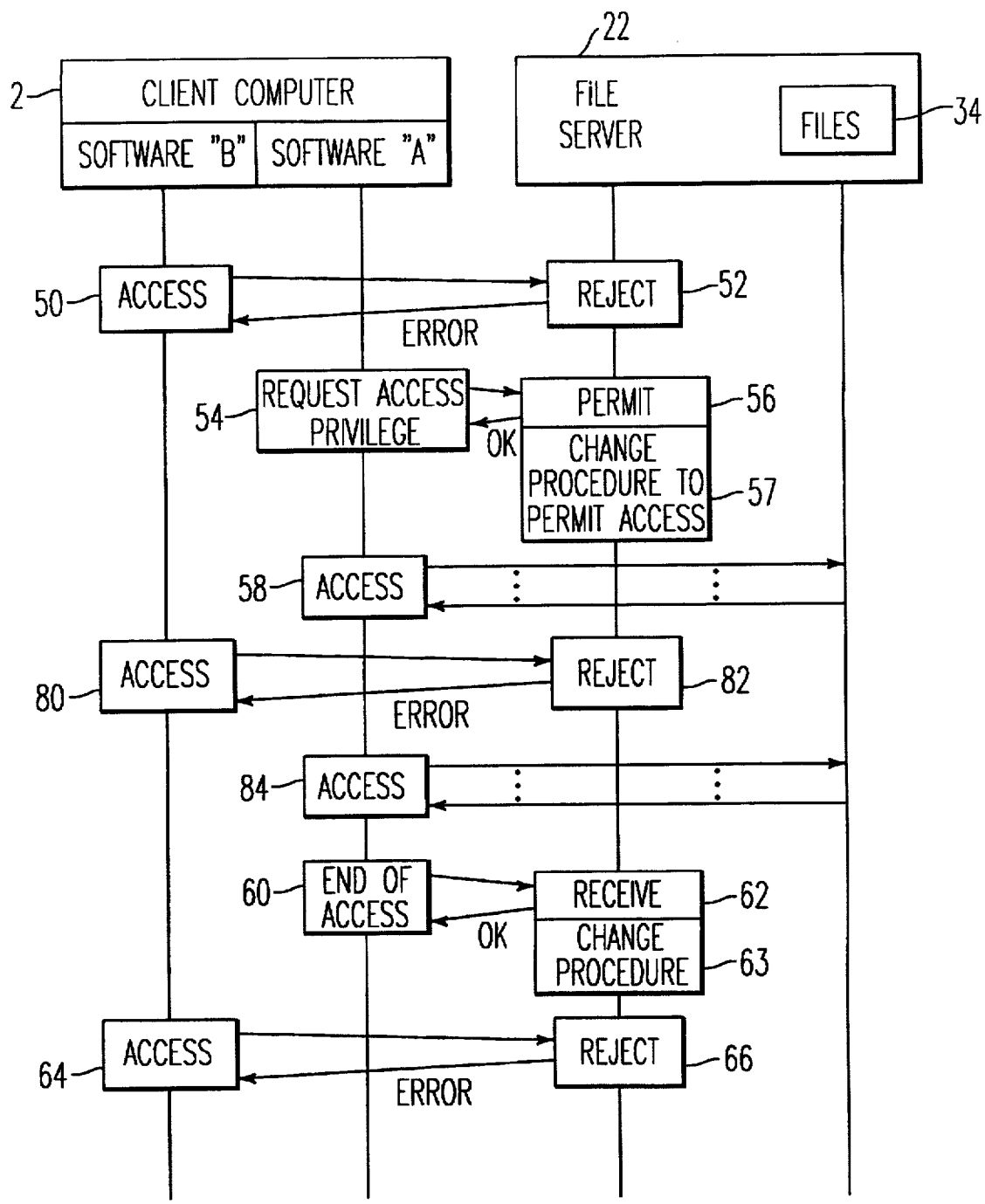
FIG. 3 is a data flow diagram showing another aspect of the operation of the invention.

FIG. 3 is a data flow diagram showing a process of accessing data according to the fifth embodiment. This diagram is similar to the diagram of FIG. 2 describing the first embodiment and a description of the same or similar steps will be omitted for brevity.

When step 54 of FIG. 3 requests an access privilege to the files 34 within the file server 22 using the appropriate key-code or password, step 56 permits access to the files. However, step 57 is also performed which changes a procedure within the file server 22 to permit all accesses from software "A" to the files 34. Accordingly, even if the software "B" attempts to access in step 80 the files 34, the file server 22 will reject this access in step 82 but allow subsequent access at approximately the same time by the software "A" in both steps 58 and 84. When the software "A" has finished accessing the files 34, an end of access command 60 is transmitted to the file server 22. Upon receipt in step 62 of this end of access command, step 63 is also performed which changes the access procedure within the file server so that the software "A" can no longer access the files 34. If the software "A" desires at a future time to access the files 34, the appropriate key-code or password must be used again.

In another embodiment of the security system, the functions of the file server 22 are implemented in the client computer 2. In this manner, the invention provides a good security system in a single computer.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for accessing information in a computer memory, comprising the steps of:
   prohibiting access to the information in the computer memory by first and second computer programs in a first computer;
   attempting access to the information in the computer memory by the first computer program in the first computer; and
   granting, to the first computer program, access to the information in the computer memory while continuing to prohibit access, by the second computer program in the first computer, to the information in the computer memory,
   wherein the step of granting access to the information in the computer memory by the first computer program includes changing an access procedure while continuing to prohibit access to the information by the second computer program in the first computer, and
   wherein the step of terminating access to the information in the computer memory by the first computer program includes changing the access procedure back to a state in which both the first and second computer programs are denied access to the information in the computer.

2. A method according to claim 1, further comprising the steps of:
   requesting by the first computer program that access by the first program to the information in the computer memory be terminated; and
   terminating access to the information in the computer memory by the first computer program.

3. A method according to claim 2, further comprising the steps of:
   attempting access to the information in the computer memory by the second computer program while the first computer program is granted access; and
   prohibiting access to the information in the computer memory by the second computer program while the first computer program is granted access.

4. A method according to claim 3, wherein the step of attempting by the second computer program is performed while the first computer program is granted access to the information in the computer memory.

5. A method according to claim 1, further comprising the steps of:
   attempting access to the information in the computer memory by the second computer program while the first computer program is granted access; and
   prohibiting access to the information in the computer memory by the second computer program while the first computer program is granted access.

6. A method according to claim 5, wherein the step of attempting by the second computer program is performed while the first computer program is granted access to the information in the computer memory.

7. A method for accessing information in a computer memory, comprising the steps of:
   prohibiting access to the information in the computer memory by first and second computer programs in a first computer;
   attempting access to the information in the computer memory by the first computer program in the first computer;
   granting, to the first computer program, access to the information in the computer memory while continuing to prohibit access, by the second computer program in the first computer, to the information in the computer memory;
   requesting by the first computer program that access by the first program to the information in the computer memory be terminated; and
   terminating access to the information in the computer memory by the first computer program,
   wherein:
   the step of requesting by the second computer program that access by the first program is to be terminated includes sending information indicating a reset operation which initializes access to the computer memory is to be performed; and
   the step of terminating access to the information in the computer memory by the first computer program includes performing an initializing operation which initializes access to the computer memory.

8. A method according to claim 7, wherein:
   there is at least one other computer memory connected to said computer memory; and
   the step of performing an initializing operation intializes only access to said computer memory without affecting access to said other computer memory.

9. A method according to claim 7, wherein:
   the step of performing an initializing operation intializes only a program used to gain access to the computer memory.

10. A system for accessing information in a computer memory, comprising:
    means for prohibiting access to the information in the computer memory by first and second computer programs in a first computer;
    means for attempting access to the information in the computer memory by the first computer program in the first computer; and
    means for granting, to the first computer program, access to the information in the computer memory while continuing to prohibit access, by the second computer program in the first computer, to the information in the computer memory, wherein:
    the means for granting access to the information in the computer memory by the first computer program includes means for changing an access procedure while continuing to prohibit access to the information by the second computer program in the first computer; and
    the means for terminating access to the information in the computer memory by the first computer program includes means for changing the access procedure back to a state in which both the first and second computer programs are denied access to the information in the computer memory.

11. A system according to claim 10, further comprising:

means for requesting by the first computer program that access by the first program to the information in the computer memory be terminated; and means for terminating access to the information in the computer memory by the first computer program.

12. A system according to claim 11, further comprising:

means for attempting access to the information in the computer memory by the second computer program while the first computer program is granted access; and means for prohibiting access to the information in the computer memory by the second computer program while the first computer program is granted access.

13. A system according to claim 12, wherein the means for attempting by the second computer program attempts while the first computer program is granted access to the information in the computer memory.

14. A system according to claim 10 further comprising:

means for attempting access to the information in the computer memory by the second computer program while the first computer program is granted access; and means for prohibiting access to the information in the computer memory by the second computer program while the first computer program is granted access.

15. A system according to claim 14, wherein the means for attempting by the second computer program attempts while the first computer program is granted access to the information in the computer memory.

16. A system for accessing information in a computer memory, comprising:

means for prohibiting access to the information in the computer memory by first and second computer programs in a first computer;

means for attempting access to the information in the computer memory by the first computer program in the first computer;

means for granting, to the first computer program, access to the information in the computer memory while continuing to prohibit access, by the second computer program in the first computer, to the information in the computer memory;

means for requesting by the first computer program that access by the first program to the information in the computer memory be terminated; and means for terminating access to the information in the computer memory by the first computer program, wherein:

the means for requesting by the second computer program that access by the first program is to be terminated includes sending information indicating a reset operation which initializes access to the computer memory is to be performed; and the means for terminating access to the information in the computer memory by the first computer program includes means for performing an initializing operation which initializes access to the computer memory.

17. A system according to claim 16, wherein:

there is at least one other computer memory connected to said computer memory; and the means for performing an initializing operation intializes only access to said computer memory without affecting access to said other computer memory.

18. A system according to claim 16, wherein:

the means for performing an initializing operation intializes only a program used to gain access to the computer memory.

* * * * *